U S009167472B2

United States Patent
Catovic et al.

(10) Patent No.: US 9,167,472 B2
(45) Date of Patent: Oct. 20, 2015

(54) METHODS AND APPARATUS FOR ENHANCED UL RLC FLOW CONTROL FOR MRAB CALLS

(75) Inventors: Amer Catovic, Carlsbad, CA (US); Mohamed A. El-saidny, Dubai (AE); Chunchung Chan, Hong Kong (HK)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 13/538,960

(22) Filed: Jun. 29, 2012

(65) Prior Publication Data
US 2013/0003542 A1    Jan. 3, 2013

Related U.S. Application Data

(60) Provisional application No. 61/504,103, filed on Jul. 1, 2011, provisional application No. 61/505,409, filed on Jul. 7, 2011.

(51) Int. Cl.
*G06F 11/00* (2006.01)
*H04J 1/16* (2006.01)
(Continued)

(52) U.S. Cl.
CPC ......... *H04W 28/0236* (2013.01); *H04L 1/0019* (2013.01); *H04L 1/1825* (2013.01); *H04L 1/1832* (2013.01); *H04L 1/1883* (2013.01); *H04L 1/203* (2013.01)

(58) Field of Classification Search
CPC  H04W 28/0236; H04L 1/0019; H04L 1/1825
USPC .............. 370/229, 230, 230.1, 231, 232, 233, 370/234, 235, 235.1, 252, 253, 254, 238, 370/239, 331, 342
See application file for complete search history.

(56) References Cited

U.S. PATENT DOCUMENTS 6,970,437 B2    11/2005    Lott et al.
7,035,240 B1    4/2006    Balakrishnan et al.
(Continued)

FOREIGN PATENT DOCUMENTS

EP    1263160 A1    12/2002
EP    1372310 A1    12/2003
(Continued)

OTHER PUBLICATIONS

3GPP TS 25.321 V10.3.0 (Jun. 2011), 3rd Generation Partnership Project; Technical Specification Group Radio Access Network; Medium Access Control (MAC) protocol specification (Release 10), 198 pages.
3GPP TS 25.331 V10.3.1, "3RD Generation Partnership Project; Technical Specification Group Radio Access Network; Radio Resource Control (RRC); Protocol Specification (Release 10)" (Apr. 2011).
Brunner, et al., "Inter-System Handover Parameter Optimization," 2006 IEEE 64th Vehicular Technology Conference, pp. 1-6.
(Continued)

*Primary Examiner* — Chuong T Ho
(74) *Attorney, Agent, or Firm* — QUALCOMM IP Department; James Hunt Yancey, Jr.

(57) ABSTRACT

Systems, devices, and methods for wireless enhanced uplink (UL) radio link control (RLC) flow control for multi-radio access bearer (MRAB) calls. In one aspect, a device configured to manage a wireless connection in a voice and data communication is provided. The device includes a receiver configured to receive radio link control (RLC) control information. The device further includes a controller configured to detect one or more radio frequency (RF) conditions. The controller is further configured to dynamically adjust, independent of the received RLC control information, RLC flow control in response to the RF conditions.

28 Claims, 4 Drawing Sheets

(51) Int. Cl.
  *H04L 12/26* (2006.01)
  *H04W 28/02* (2009.01)
  *H04L 1/00* (2006.01)
  *H04L 1/18* (2006.01)
  *H04L 1/20* (2006.01)

(56) References Cited

U.S. PATENT DOCUMENTS

| | | | |
|---|---|---|---|
| 7,289,473 | B1* | 10/2007 | Padovani et al. ............. 370/332 |
| 7,379,478 | B1 | 5/2008 | Mantha |
| 7,751,320 | B2 | 7/2010 | Nuzman et al. |
| 7,962,148 | B2 | 6/2011 | Stamoulis et al. |
| 8,041,375 | B2 | 10/2011 | Laroia et al. |
| 8,620,337 | B2 | 12/2013 | Meredith et al. |
| 8,634,384 | B2 | 1/2014 | Marsh |
| 8,755,745 | B2* | 6/2014 | Gandolfo ................. 455/41.2 |
| 2003/0021262 | A1 | 1/2003 | Ma et al. |
| 2005/0180449 | A1 | 8/2005 | Ranta-Aho et al. |
| 2006/0154603 | A1 | 7/2006 | Sachs et al. |
| 2006/0195727 | A1 | 8/2006 | Yoshitsugu et al. |
| 2006/0291395 | A1 | 12/2006 | Ketonen et al. |
| 2008/0008136 | A1* | 1/2008 | Padovani et al. ............. 370/336 |
| 2008/0043619 | A1 | 2/2008 | Sammour et al. |
| 2008/0130584 | A1 | 6/2008 | Pani et al. |
| 2008/0132268 | A1 | 6/2008 | Choi-Grogan et al. |
| 2008/0144598 | A1 | 6/2008 | Jiang |
| 2008/0186944 | A1 | 8/2008 | Suzuki et al. |
| 2008/0194282 | A1 | 8/2008 | Nibe et al. |
| 2008/0226074 | A1* | 9/2008 | Sammour et al. ............. 380/270 |
| 2008/0310338 | A1 | 12/2008 | Charpenter et al. |
| 2009/0044067 | A1 | 2/2009 | Obuchi et al. |
| 2009/0093255 | A1 | 4/2009 | Balasubramanian |
| 2009/0104901 | A1 | 4/2009 | Baker et al. |
| 2009/0135773 | A1 | 5/2009 | Aghili et al. |
| 2009/0157852 | A1 | 6/2009 | Krupkin et al. |
| 2009/0161545 | A1 | 6/2009 | Ho et al. |
| 2009/0175175 | A1* | 7/2009 | Somasundaram et al. .... 370/242 |
| 2010/0008302 | A1 | 1/2010 | Sayers et al. |
| 2010/0034114 | A1 | 2/2010 | Kim et al. |
| 2010/0091723 | A1 | 4/2010 | Park et al. |
| 2010/0113006 | A1 | 5/2010 | Pajjuri et al. |
| 2010/0144363 | A1 | 6/2010 | De Rosa et al. |
| 2010/0165901 | A1 | 7/2010 | Kim |
| 2010/0195519 | A1 | 8/2010 | Ji |
| 2010/0220615 | A1 | 9/2010 | Enstrom et al. |
| 2010/0260049 | A1 | 10/2010 | Racz et al. |
| 2010/0278341 | A1 | 11/2010 | Kubota |
| 2010/0316040 | A1 | 12/2010 | Kim et al. |
| 2010/0323748 | A1* | 12/2010 | Padovani et al. ............. 455/522 |
| 2011/0009073 | A1* | 1/2011 | Burbidge et al. ............. 455/68 |
| 2011/0019756 | A1 | 1/2011 | Chun et al. |
| 2011/0105174 | A1 | 5/2011 | Pelletier et al. |
| 2011/0149787 | A1 | 6/2011 | Digirolamo et al. |
| 2011/0158140 | A1 | 6/2011 | Asokan |
| 2011/0158194 | A1 | 6/2011 | Musikka et al. |
| 2011/0179329 | A1 | 7/2011 | Kim et al. |
| 2011/0194479 | A1 | 8/2011 | Jin et al. |
| 2011/0243080 | A1 | 10/2011 | Chen et al. |
| 2011/0249563 | A1* | 10/2011 | Provvedi et al. ............. 370/241 |
| 2011/0268088 | A1 | 11/2011 | Lindskog et al. |
| 2011/0269463 | A1 | 11/2011 | Wang et al. |
| 2011/0286387 | A1 | 11/2011 | Sane et al. |
| 2011/0317719 | A1 | 12/2011 | Vedantham et al. |
| 2012/0002541 | A1 | 1/2012 | Lee et al. |
| 2012/0009930 | A1 | 1/2012 | Brisebois et al. |
| 2012/0020286 | A1 | 1/2012 | Damnjanovic et al. |
| 2012/0026921 | A1 | 2/2012 | Choi |
| 2012/0064908 | A1 | 3/2012 | Fox et al. |
| 2012/0069750 | A1 | 3/2012 | Xing et al. |
| 2012/0082096 | A1* | 4/2012 | Cave et al. ............. 370/328 |
| 2012/0083264 | A1 | 4/2012 | Ramasamy et al. |
| 2012/0093110 | A1* | 4/2012 | Somasundaram et al. .... 370/329 |
| 2012/0178438 | A1 | 7/2012 | Vashi et al. |
| 2012/0201134 | A1 | 8/2012 | Wang et al. |
| 2012/0269148 | A1 | 10/2012 | Hultell et al. |
| 2013/0003523 | A1* | 1/2013 | Singh et al. ............. 370/216 |
| 2013/0003631 | A1 | 1/2013 | Catovic et al. |
| 2013/0021915 | A1 | 1/2013 | Catovic et al. |
| 2013/0033990 | A1 | 2/2013 | Catovic et al. |
| 2013/0064098 | A1 | 3/2013 | El-Saidny et al. |
| 2013/0077616 | A1 | 3/2013 | Arulprakasam et al. |
| 2013/0148499 | A1* | 6/2013 | Racz et al. ............. 370/230 |
| 2014/0133323 | A9* | 5/2014 | Guarino ............. 370/252 |
| 2015/0009950 | A1* | 1/2015 | Sundberg et al. ............. 370/330 |

FOREIGN PATENT DOCUMENTS

| | | |
|---|---|---|
| EP | 1465371 A1 | 10/2004 |
| EP | 1653758 A1 | 5/2006 |
| EP | 1768296 A2 | 3/2007 |
| EP | 1811690 A1 | 7/2007 |
| EP | 1956728 A2 | 8/2008 |
| EP | 2256996 A1 | 12/2010 |
| EP | 2317815 A1 | 5/2011 |
| JP | 2006087113 A | 3/2006 |
| JP | 2008048325 A | 2/2008 |
| JP | 2008199157 A | 8/2008 |
| JP | 2009044370 A | 2/2009 |
| JP | 2009517935 A | 4/2009 |
| JP | 2009188739 A | 8/2009 |
| JP | 2011518468 A | 6/2011 |
| JP | 2012521150 A | 9/2012 |
| JP | 2013506364 A | 2/2013 |
| WO | 0038368 A1 | 6/2000 |
| WO | 0122645 A1 | 3/2001 |
| WO | 0193513 A2 | 12/2001 |
| WO | 2005011212 A1 | 2/2005 |
| WO | 2005015940 A1 | 2/2005 |
| WO | 2005112500 A1 | 11/2005 |
| WO | 2006012377 A1 | 2/2006 |
| WO | 2008097544 A2 | 8/2008 |
| WO | 2009046374 | 4/2009 |
| WO | 2009058085 A2 | 5/2009 |
| WO | 2009116939 A2 | 9/2009 |
| WO | 2010088295 A1 | 8/2010 |
| WO | 2010107360 A1 | 9/2010 |
| WO | 2011025438 A1 | 3/2011 |
| WO | 2011072735 A1 | 6/2011 |

OTHER PUBLICATIONS

International Search Report and Written Opinion—PCT/US2012/045327—ISA/EPO—Sep. 21, 2012.
Siemens: "Contribution to Power Limit Problem in HSDPA Case", 3GPP Draft; R2-040981, 3rd Generation Partnership Project (3GPP), Mobile Competence Centre ; 650, Route Des Lucioles ; F-06921 Sophia-Antipolis Cedex ; France, vol. RAN WG2, No. Montreal, Canada; 20040517, May 17, 2004, XP050125851.
Xu, et al., "Performance Analysis on the Radio Link Control Protocol of UMTS System," Proceedings from 2002 IEEE 56th Vehicular Technology Conference, vol. 4, pp. 2026-2030.
Samsung, "CQI and ACK/NACK Transmission Supporting Dual-Cell HSDPA", 3GPP TSG-RAN WG1#54b, R1-083562, Oct. 3, 2008.
Renesas Mobile Europe Ltd: "Cell update-less RLC/PDCP unrecoverable error recovery", 3GPP R2-113178, 3GPP, May 9, 2011, 2 Pages.
Nokia Corporation: "Discussion of handling of RLC UM error and ciphering issue during CS-HSPA", R2-091502, 3GPP, Jan. 13, 2009, 3 Pages.
Siemens: "Upper ARQ", 3GPP TSG-RAN WG RAN2 #52, R2-060929, Mar. 23, 2006, 3 Pages.
Japanese Office Action—Mailing Date Jul. 21, 2015 (Patent Application No. 2014-519243).
Translation of Office Action—Japanese Office Action—Mailing Date Jul. 21, 2015 (Patent Application No. 2014-519243) (Provided by JPO Counsel).

* cited by examiner

METHODS AND APPARATUS FOR ENHANCED UL RLC FLOW CONTROL FOR MRAB CALLS

CROSS-REFERENCE TO RELATED APPLICATIONS

The disclosure claims priority to U.S. Provisional Patent Application No. 61/504,103, filed Jul. 1, 2011, entitled "METHODS AND APPARATUS FOR ENHANCED UL RLC FLOW CONTROL FOR mRAB CALLS," and assigned to the assignee hereof, and to U.S. Provisional Patent Application No. 61/505,409, filed Jul. 7, 2011, entitled "Methods and Apparatus for Enhanced UL RLC Flow Control for mRAB calls," and assigned to the assignee hereof. The disclosures of both prior applications are considered part of, and are incorporated by reference in, this disclosure.

BACKGROUND

Aspects of the present invention relate to wireless communication, and in particular, to systems, method and apparatus configured to enable multiple radio access bearer communications based on wireless conditions.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals (e.g. cellphones, tablet computers and other electronic devices). Each wireless terminal communicates with one or more base stations via transmissions on one or more uplinks and downlinks. A downlink (or forward link) refers to the communication link from the base stations to the wireless terminal, and an uplink (or reverse link) refers to the communication link from the wireless terminal to the base station. These communication links may be established via a single-in-single-out (SISO), multiple-in-single-out (MISO), or a multiple-in-multiple-out (MIMO) system.

A MIMO system employs multiple transmit antennas and multiple receive antennas for data transmission. A MIMO channel formed by the transmit and receive antennas may be decomposed into independent channels, which are also referred to as spatial channels. Each of the independent channels corresponds to a dimension. The MIMO system can provide improved performance (e.g., higher throughput and/or greater reliability) if the additional dimensions created by the multiple transmit and receive antennas are utilized.

A MIMO system supports time division duplex (TDD) and frequency division duplex (FDD) systems. In a TDD system, the uplink and downlink transmissions are within the same frequency region so that the reciprocity principle allows the estimation of the downlink channel from the uplink channel. This enables the base station to extract transmit beamforming gain on the downlink when multiple antennas are available at the base station.

The primary purpose of the base station is to provide connectivity between a wireless terminal or terminals and the core communications network. In a UMTS radio access network (RAN), the functionalities of a base station may be split across two network elements: the Radio Network Controller (RNC) handles, among other functions, connection setup, resource assignment and mobility; the base node (NodeB) configured to handle the radio transmission and reception to and from wireless terminals as well as the resource allocation for connected users on the shared channels.

To establish a call connection between a wireless terminal and a base station, a Radio Access Bearer (RAB) is needed. The RAB carries voice or other data between the wireless terminal and the core communication network. There are different types of RABs for different types of data, such as, for example, voice data, streaming data (e.g. streaming a video clip), interactive data (e.g. interacting with a website) and others. Simultaneous voice and data connections require multiple RABs and may be referred to as Multi-RAB or MRAB connections. In the early days of combined voice and data networks, e.g. 3G UMTS, simultaneous voice and data connections were not prevalent. However, newer wireless terminal devices (e.g. touch-screen cellular telephones) increasingly use voice and data connections simultaneously. Accordingly, there is a need for improved management of MRAB resources. Particularly, MRAB calls can experience a significantly higher dropped call rate (DCR) compared to voice calls in UMTS 3G networks world-wide. Dedicated optimizations on the network and user equipment (UE) side can mitigate the poor performance of MRAB calls.

SUMMARY

Various implementations of systems, methods and apparatus within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations are used to manage power allocation to various channels in MRAB calls.

In one aspect, a method of managing a wireless connection in a voice and data communication is provided. The method includes receiving radio link control (RLC) control information. The method further includes detecting one or more radio frequency (RF) conditions. The method further includes dynamically adjusting, independent of the received RLC control information, RLC flow control in response to the RF conditions.

In one embodiment, the adjusting can be performed by user equipment. In one embodiment, the adjusting can be performed by network equipment. In one embodiment, the adjusting can include adjusting one or more RLC parameters. In one embodiment, the adjusting can include adjusting the one or more RLC parameters beyond respective standardized values. In one embodiment, the adjusting can include extending a range of allowable RLC parameter settings. The one or more RLC parameters can include one or more of: max reset timers and counters, RLC window sizes, poll timers, reset timers, and status timers. The detecting can be triggered by at least one of: an RF measurement, a block error rate (BLER), a number of re-transmissions, and an occurrence rate of RLC resets.

another aspect, a device configured to manage a wireless connection in a voice and data communication is provided. The device includes a receiver configured to receive radio link control (RLC) control information. The device further includes a controller configured to detect one or more radio frequency (RF) conditions. The controller is further configured to dynamically adjust, independent of the received RLC control information, RLC flow control in response to the RF conditions.

In one embodiment, the device can be configured as user equipment. In one embodiment, the device can be configured as network equipment. In one embodiment, the controller can be configured to adjust the RLC flow control by adjusting one or more RLC parameters. In one embodiment, the controller can be configured to adjust the RLC flow control by adjusting the one or more RLC parameters beyond respective standardized values. In one embodiment, the controller can be configured to adjust the RLC flow control by extending a range of allowable RLC parameter settings. The one or more RLC parameters can include one or more of: max reset timers and counters, RLC window sizes, poll timers, reset timers, and status timers. The controller can be configured to detect the one or more radio frequency (RF) conditions triggered by at least one of: an RF measurement, a block error rate (BLER), a number of re-transmissions, and an occurrence rate of RLC resets.

In another aspect, an apparatus for managing a wireless connection in a voice and data communication is provided. The apparatus includes means for receiving radio link control (RLC) control information. The apparatus further includes means for detecting one or more radio frequency (RF) conditions. The apparatus further includes means for dynamically adjusting, independent of the received RLC control information, RLC flow control in response to the RF conditions.

In one embodiment, the means for adjusting can include user equipment. In one embodiment, the means for adjusting can include network equipment. In one embodiment, means for adjusting can include means for adjusting one or more RLC parameters. In one embodiment, means for adjusting can include means for adjusting the one or more RLC parameters beyond respective standardized values. In one embodiment, means for adjusting can include means for extending a range of allowable RLC parameter settings. The one or more RLC parameters can include one or more of: max reset timers and counters, RLC window sizes, poll timers, reset timers, and status timers. Means for detecting can be triggered by at least one of: an RF measurement, a block error rate (BLER), a number of re-transmissions, and an occurrence rate of RLC resets.

In another aspect, a non-transitory computer readable storage medium is provided. The medium includes instructions that, when executed by at least one processor of an apparatus, cause the apparatus to receive radio link control (RLC) control information. The medium further includes instructions that, when executed by at least one processor of the apparatus, cause the apparatus to detect one or more radio frequency (RF) conditions. The medium further includes instructions that, when executed by at least one processor of the apparatus, cause the apparatus to dynamically adjust, independent of the received RLC control information, RLC flow control in response to the RF conditions.

In one embodiment, the apparatus can include user equipment. In one embodiment, the apparatus can include network equipment. In one embodiment, the medium can further include instructions that, when executed by at least one processor of the apparatus, cause the apparatus to adjusting one or more RLC parameters. In one embodiment, the medium can further include instructions that, when executed by at least one processor of the apparatus, cause the apparatus to adjust the one or more RLC parameters beyond respective standardized values. In one embodiment, the medium can further include instructions that, when executed by at least one processor of the apparatus, cause the apparatus to extend a range of allowable RLC parameter settings. The one or more RLC parameters can include one or more of: max reset timers and counters, RLC window sizes, poll timers, reset timers, and status timers. In one embodiment, the medium can further include instructions that, when executed by at least one processor of the apparatus, cause the apparatus to trigger said detection by at least one of: an RF measurement, a block error rate (BLER), a number of re-transmissions, and an occurrence rate of RLC resets.

BRIEF DESCRIPTION OF THE DRAWINGS

So that the manner in which features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

Figure 1:
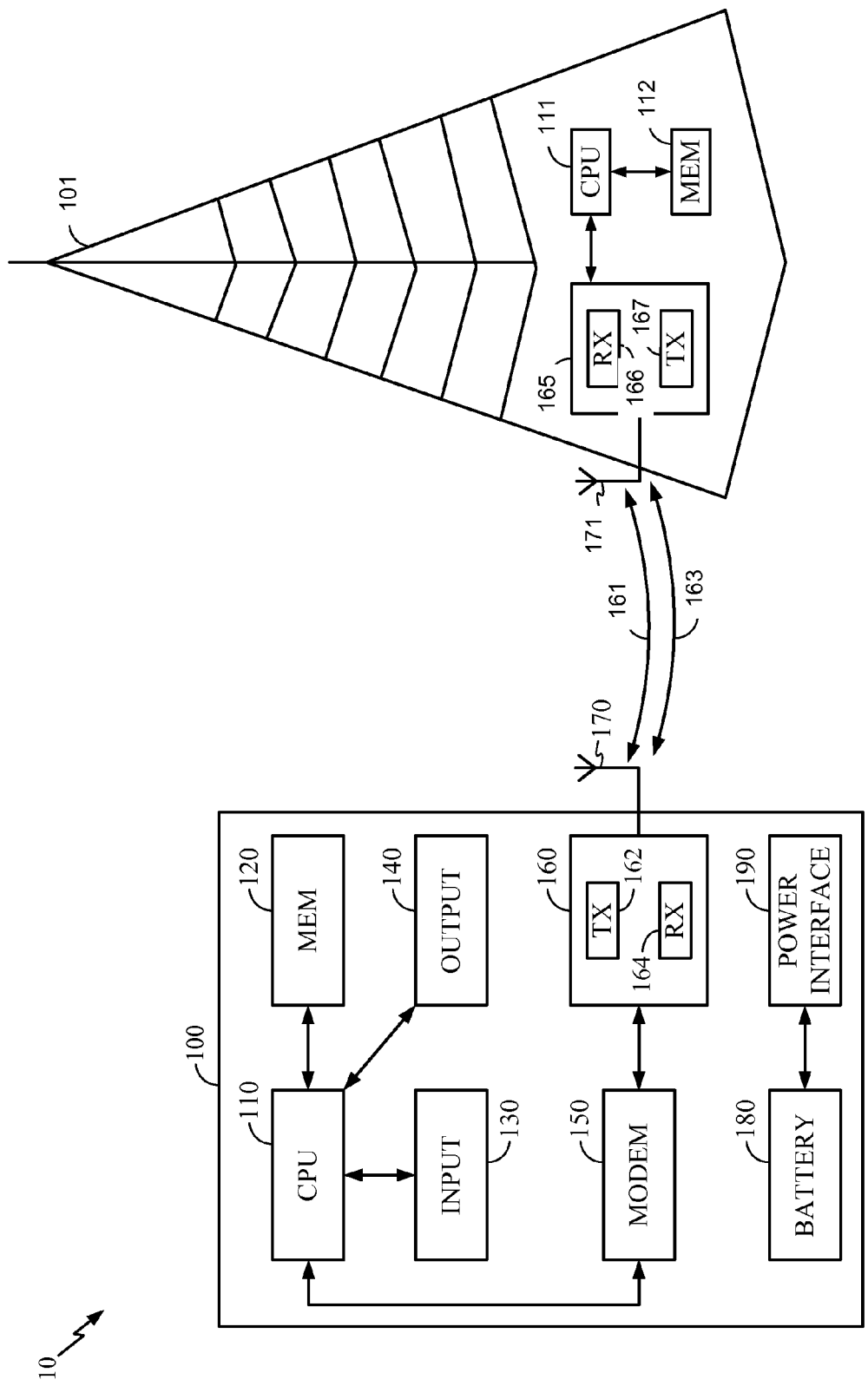
FIG. 1 shows an exemplary functional block diagram of a wireless communication system.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of implementations within the scope of the appended claims are described below. It should be apparent that the aspects described herein may be implemented in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA)

networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, IEEE 802.22, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). Similarly, cdma2000 is described in documents from an organization named "3rd Generation Partnership Project 2" (3GPP2).

In some aspects the teachings herein may be employed in a network that includes macro scale coverage (e.g., a large area cellular network such as a 3G network, typically referred to as a macro cell network) and smaller scale coverage (e.g., a residence-based or building-based network environment). As a wireless terminal (WT) or user equipment (UE) moves through such a network, the wireless terminal may be served in certain locations by base stations (BSs) or access nodes (ANs) that provide macro coverage while the wireless terminal may be served at other locations by access nodes that provide smaller scale coverage, e.g. femto nodes (FNs). In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, access point, base station, Node B, eNodeB, macro cell, and so on. Also, a femto node may be configured or referred to as a Home NodeB (HNB), Home eNodeB (HeNB), access point access point, femto cell, and so on.

FIG. 1 shows an exemplary functional block diagram of a wireless communication system. The wireless communication system 10 may include at least one wireless terminal 100 and at least one base station 101 configured to communicate with each other over a first communication link 161 and a second communication link 163. Each of the first and second communication links 161, 163 can be a single-packet communication link on which a single packet may be transmitted during each cycle or a multi-packet communication link on which on which multiple packets may be transmitted during each cycle. For example, the first communication link 161 can be a dual-packet communication link on which zero, one, or two packets can be transmitted during each cycle.

In the implementation shown in FIG. 1, the wireless terminal 100 includes at least one processor 110 coupled with a memory 120, an input device 130, and an output device 140. The processor may be coupled with a modem 150 and a transceiver 160. The transceiver 160 shown is also coupled with the modem 150 and an antenna 170. The wireless terminal 100 and components thereof may be powered by a battery 180 and/or an external power source. In some implementations, the battery 180, or a portion thereof, is rechargeable by an external power source via a power interface 190. Although described separately, it is to be appreciated that functional blocks described with respect to the wireless terminal 100 need not be separate structural elements. For example, the processor 110 and memory 120 may be implemented in a single chip. Similarly, two or more of the processor 110, modem 150, and transceiver 160 may be implemented in a single chip.

The processor 110 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. At least one processor may also be implemented as a combination of computing devices, e.g., a combination of a DSP and a microprocessor, a plurality of microprocessors, one or more microprocessors in conjunction with a DSP core, or any other such configuration.

In the implementation shown in FIG. 1, the processor 110 can be coupled, via one or more buses, with read information from or write information to the memory 120. The processor may additionally, or in the alternative, contain memory, such as processor registers. The memory 120 can include processor cache, including a multi-level hierarchical cache in which different levels have different capacities and access speeds. The memory 120 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 110 is also coupled with an input device 130 and an output device 140 configured for, respectively, receiving input from and providing output to, a user of the wireless terminal 100. Suitable input devices may include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled with audio processing software to, e.g., detect voice commands). Suitable output devices may include, but are not limited to, visual output devices, including displays and printers, audio output devices, including speakers, headphones, earphones, and alarms, and haptic output devices, including force-feedback game controllers and vibrating devices.

The processor 110 may be coupled with a modem 150 and a transceiver 160. The modem 150 and transceiver 160 may be configured to prepare data generated by the processor 110 for wireless transmission over the communication links 161, 163 via the antenna 170. The modem 150 and transceiver 160 also demodulate data received over the communication links 161, 163 via the antenna 170. In some implementations, the modem 150 and the transceiver 160 may be configured to operate according to one or more air interface standards. The transceiver can include a transmitter 162, a receiver 164, or both. In other implementations, the transmitter 162 and receiver 164 are two separate components. The modem 150 and transceiver 160, can be implemented as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. The antenna 170 can include multiple antennas for multiple-input/multiple-output (MIMO) communication.

The wireless terminal 100 and components thereof may be powered by a battery 180 and/or an external power source. The battery 180 can be any device which stores energy, and particularly any device which stores chemical energy and provides it as electrical energy. The battery 180 can include one or more secondary cells including a lithium polymer battery, a lithium ion battery, a nickel-metal hydride battery, or a nickel cadmium battery, or one or more primary cells including an alkaline battery, a lithium battery, a silver oxide battery, or a zinc carbon battery. The external power source can include a wall socket, a vehicular cigar lighter receptacle, a wireless energy transfer platform, or the sun.

In some implementations, the battery 180, or a portion thereof, is rechargeable by an external power source via a power interface 190. The power interface 190 can include a jack for connecting a battery charger, an inductor for near field wireless energy transfer, or a photovoltaic panel for converting solar energy into electrical energy.

In some implementations, the wireless terminal 100 is a mobile telephone, a personal data assistant (PDAs), a handheld computer, a laptop computer, a wireless data access card, a GPS receiver/navigator, a camera, an MP3 player, a camcorder, a game console, a wrist watch, a clock, or a television.

As shown in FIG. 1, the base station 101 also includes at least at least one processor 111 coupled with a memory 112 and a transceiver 165. The transceiver 165 includes a transmitter 167 and a receiver 166 coupled with an antenna 171. The processor 111, memory 112, transceiver 165, and antenna 171 can be implemented as described above with respect to the wireless terminal 100.

In the wireless communication system 10 of FIG. 1, the base station 101 can transmit data packets to the wireless terminal 100 via a first communication link 161 and/or a second communication link 163.

Figure 2:
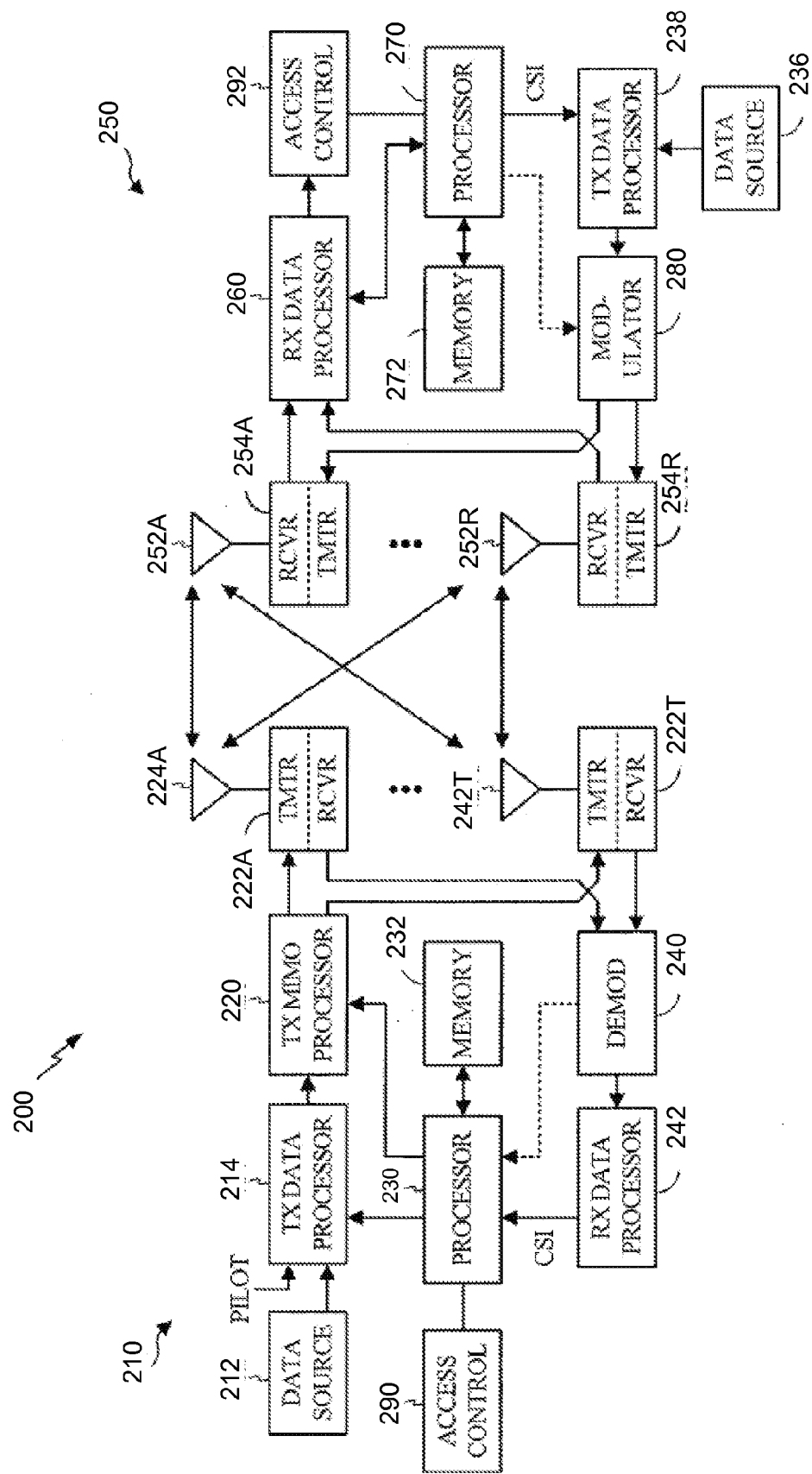
FIG. 2 shows an exemplary functional block diagram of components that may be employed to facilitate communication between communication nodes, such a wireless terminal and a base station.

FIG. 2 shows an exemplary functional block diagram of components that may be employed to facilitate communication between communication nodes, such a wireless terminal and a base station. Specifically, FIG. 2 is a simplified block diagram of a first wireless device 210 (e.g., a base station) and a second wireless device 250 (e.g., a wireless terminal) of a communication system 200. At the first device 210, traffic data for a number of data streams is provided from a data source 212 to a transmit (TX) data processor 214.

In some implementations, each data stream is transmitted over a respective transmit antenna. The TX data processor 214 may be configured to format, code, and interleave the traffic data for each data stream based on a particular coding scheme selected for that data stream.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by at least one processor 230. A data memory 232 may store program code, data, and other information used by the processor 230 or other components of the device 210.

In the implementation shown in FIG. 2, the modulation symbols for some data streams may be provided to a TX MIMO processor 220, which may further process the modulation symbols (e.g., for OFDM). The TX MIMO processor 220 then provides modulation symbol streams to transceivers (XCVR) 222A through 222T. In some aspects, the TX MIMO processor 220 applies beam-forming weights to the symbols of the data streams and to the antenna from which the symbol is being transmitted.

Each transceiver 222 receives and processes a respective symbol stream to provide one or more analog signals, and further conditions (e.g., amplifies, filters, and upconverts) the analog signals to provide a modulated signal suitable for transmission over the channel. Modulated signals from transceivers 222A through 222T are then transmitted from antennas 224A through 224T, respectively.

At the second device 250, the transmitted modulated signals are received by antennas 252A through 252R and the received signal from each antenna 252 is provided to a respective transceiver (XCVR) 254A through 254R. Each transceiver 254 may be configured to condition (e.g., filters, amplifies, and downconverts) a respective received signal, digitizes the conditioned signal to provide samples, and further processes the samples to provide a corresponding "received" symbol stream.

A receive (RX) data processor 165 then receives and processes the received symbol streams from transceivers 254 based on a particular receiver processing technique to provide "detected" symbol streams. The RX data processor 165 then demodulates, deinterleaves, and decodes each detected symbol stream to recover the traffic data for the data stream. The processing by the RX data processor 165 is complementary to that performed by the TX MIMO processor 220 and the TX data processor 214 at the device 210.

The processor 270 formulates an uplink message, which may comprise various types of information regarding the communication link and/or the received data stream. The reverse link message is then processed by a TX data processor 238, which also receives traffic data for a number of data streams from a data source 236, modulated by a modulator 280, conditioned by the transceivers 254A through 254R, and transmitted back to the device 210.

At the device 210, the modulated signals from the second device 250 are received by the antennas 224, conditioned by the transceivers 222, demodulated by a demodulator (DEMOD) 240, and processed by an RX data processor 242 to extract the uplink message transmitted by the second device 250. The processor 230 then processes the extracted message.

FIG. 2 also illustrates that the communication components may include one or more components that perform access control. For example, an access control component 290 may cooperate with the processor 230 and/or other components of the device 210 to send/receive signals to/from another device (e.g., device 250). Similarly, an access control component 292 may cooperate with the processor 270 and/or other components of the device 250 to send/receive signals to/from another device (e.g., device 210). It should be appreciated that for each device 210 and 250 the functionality of two or more of the described components may be provided by a single component. For example, a single processing component may provide the functionality of the access control component 290 and the processor 230 and a single processing component may provide the functionality of the access control component 292 and the processor 270.

The interface between base stations and wireless terminals may be described by a protocol stack that consists of a number of protocol layers, each giving a specific service to the next layer above and/or below. For example, a top layer of the protocol stack, sometimes referred to as the radio resource control (RRC) layer, may control signaling to control the wireless connection to the wireless terminal. This layer may additionally provide control of aspects of the wireless terminal from the base station and may include functions to control radio bearers, physical channels, mapping of different channel types, measurement and other functions.

In some instances, failure of a data connection in MRAB calls, such as a Packet Switched (PS) RAB in poor radio frequency (RF) environments, can cause a higher DCR. Even in poor RF conditions when the wireless terminal 100 transmit power reaches the maximum level, the wireless terminal 100 can continue sending small amounts of data in the uplink (UL). In an embodiment, a minimum set of Transport Format Combinations (TFCs) is a set of TFCs that the wireless terminal 100 is allowed to transmit in the UL regardless of an assigned transmit power budget and/or headroom restriction. In some implementations, a TFC including only one Transmit Block from the PS RAB is in the Minimum Set of TFCs. Accordingly, data can be transmitted in the UL even when the wireless terminal 100 is running out of power, provided that there is no voice or signaling to be transmitted.

However, the transmitted UL data may not be acknowledged by the access point (AP) due to the poor RF conditions. After relevant timers expire, the wireless terminal 100 can trigger a radio link control (RLC) reset procedure. In various circumstances, the reset procedure can also fail due to the poor RF conditions. Unsuccessful reset can lead to a drop of the Radio Resource Control (RRC) connection, resulting in a dropped call compliant with the applicable standard. Under some policies, it may be acceptable for data-only calls to drop, because they can be easily re-established. On the other hand, it may not be acceptable for MRAB calls to drop under circumstances where a reset on the data call will bring down the voice call as well.

Accordingly, there is a need to isolate the PS RABs from the other RABs to prevent the PS RABs from bringing down an entire connection in poor RF conditions. In an embodiment, the wireless terminal 100 can adjust RLC flow control in response to detected RF conditions. More specifically, the wireless terminal 100 can avoid or delay sending an RLC reset in poor RF conditions such as where a failed reset would cause the circuit switched (CS) call to fail after a failed data connection. The methods and systems described herein are particularly applicable to Voice+Release 99 (R99) UL+HSDPA downlink (DL) MRAB configurations.

In an embodiment, the wireless terminal 100 can dynamically adjust one or more RLC parameters unilaterally to avoid RLC resets. The RLC parameters can include (but are not limited to) one or more of: max reset timers and counters, RLC window sizes, poll timers, reset timers, and status timers. In some embodiments, the wireless terminal 100 may only adjust data-specific RLC parameters. The wireless terminal 100 can adjust the RLC parameters based on one or more of the following conditions: RF quality measurements (such as RSCP, Ec/No, CQI, etc.), Block Error Rate (BLER) at various layers (such as physical layer, MAC layer, RLC layer, etc.), number of re-transmissions, occurrence of RLC reset, and other triggering points that reflect poor RF conditions.

The wireless terminal 100 can adjust RLC flow control parameters in intervals and amounts using on one or more of: periodic changes, event triggered changes, and incremental changes with increasing/decreasing amounts. For example, in a deteriorating RF environment, the adjustments can be more frequent, and vice versa. Moreover, in deteriorating RF environments, the adjustment step-size can be greater, and vice versa.

Figure 3:
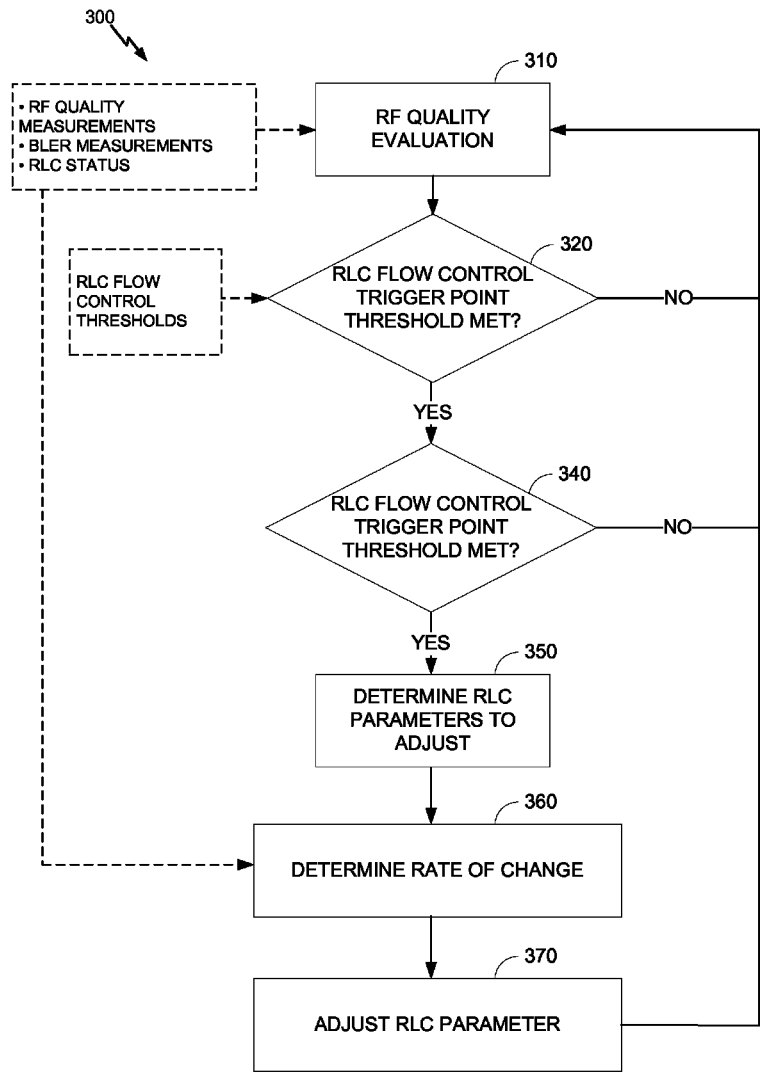
FIG. 3 shows an exemplary flowchart illustrating an implementation of a method of wireless condition based communication in the wireless terminal of FIG. 1.

FIG. 3 shows an exemplary flowchart illustrating an implementation of a method 300 of wireless communication in the wireless terminal 100 of FIG. 1. Although the method 300 is described herein with reference to the wireless terminal 100 discussed above with respect to FIG. 1, a person having ordinary skill in the art will appreciate that the method 300 may be implemented by any other suitable device such as, for example, one or both of the devices 210 and 250 (FIG. 2). In an embodiment, method 300 may be performed by the CPU 110 in conjunction with the transmitter 162, the receiver 164, and the memory 120. Although the method 300 is described herein with reference to a particular order, in various embodiments, blocks herein may be performed in a different order, or omitted, and additional blocks may be added.

First, the method 300 begins at block 310 where the wireless terminal 100 evaluates RF quality along one or more metrics. In various embodiments, the wireless terminal 100 can receive or create one or more quality indications such as, for example, RF quality measurements (e.g., received signal code power, received signal strength, pilot channel quality, channel quality indicator), a block error rate (e.g., physical layer, medium access control layer, radio link control layer), the number of packets re-transmitted by the wireless terminal, the number of packets acknowledged by the base station, the number of packets unacknowledged by the base station, the occurrence of a radio link control (RLC) layer reset and/or other RLC flow control and status indicators, the transmit power of the device exceeding a threshold, and/or other indicia of poor wireless communication conditions. In some implementations, a controller may obtain the various quality indicators directly or indirectly from one or more detectors. A detector may provide the quality indicators by storing the detected quality indicators in a memory. The quality may be discrete or be an aggregated assessment (e.g., average values for a factor, composite calculation including multiple factors).

Next, at block 320, the wireless terminal 100 evaluates whether the RLC flow control has surpassed a threshold trigger point. The threshold can be received from another device (such as the base station 101) or determined locally (either dynamically or in advance). In some implementations, a controller may obtain one or more RLC flow control thresholds (which can each apply to a different flow control metric), from a memory, a baseband processor, or the like. If the threshold is not met, the wireless terminal 100 can continue to evaluate RF quality at block 310. If, on the other hand, the threshold is met, the wireless terminal 100 can proceed to block 340.

Then, at block 340, the wireless terminal 100 determines whether there is transmit data available in an RLC buffer. If there is no transmit data available in the RLC buffer, the wireless terminal 100 can continue to evaluate RF quality at block 310. If, on the other hand, there is transmit data available in the RLC buffer, the wireless terminal 100 can proceed to block 350.

Subsequently, at block 350, the wireless terminal 100 determines one or more RLC parameters to adjust. As discussed above, the wireless terminal 100 can potentially adjust one or more of: max reset timers and counters, RLC window sizes, poll timers, reset timers, and status timers.

Thereafter, at block 360, the wireless terminal 100 can further determine an interval and/or amount to change each of the RLC parameters to be adjusted. The interval and/or amount can be based on the RF quality indicators discussed above. In various embodiments, the one or more RLC parameters can be changed at a one or more selected rates in terms of amplitude and/or frequency. For example, the wireless terminal 100 can apply periodic changes, event triggered changes, and incremental changes with increasing/decreasing amounts. With respect to frequency, the adjustments can be more or less frequent. With respect to amplitude, the adjustment step-size can be greater or smaller.

Next, at block 370, the wireless terminal 100 can adjust the selected RLC parameters in accordance with the interval and/or amounts determined. In an exemplary embodiment discussed below, the wireless terminal 100 can extend an RLC maximum reset timer and counter.

In some embodiments, a maximum reset timer may have, for example, an integer range (in milliseconds) which can be used to trigger the retransmission of a RESET PDU. Exemplary values include 50, 100, 150, 200, 250, 300, 350, 400, 450, 500, 550, 600, 700, 800, 900, and 1000 milliseconds. In an embodiment, the range of the maximum reset timer can be extended beyond 1000 milliseconds. The range extension can be a linear or exponential increase in the integer value when the wireless terminal 100 (or RLC transmit entity) receives no RESET ACK from the network (or RLC receive entity).

Similarly, a maximum reset counter may have an integer range which defines how many times the RESET PDU will be transmitted before determining that an unrecoverable error has occurred. Exemplary values include 1, 4, 6, 8, 12, 16, 24, and 32. In an embodiment, the range of the maximum reset counter can be extended beyond 32, and can include an "infinite" value wherein the wireless terminal 100 will not determine that an unrecoverable error has occurred.

For both the range extended maximum reset time and the range extended maximum reset counter, the range extension can be limited to times when the wireless terminal 100 is in a multi-RAB call with both packet switched (PS) and circuit switched (CS) portions active. When the CS portion is released, the wireless terminal 100 may stop range-extending the RLC settings.

Figure 4:
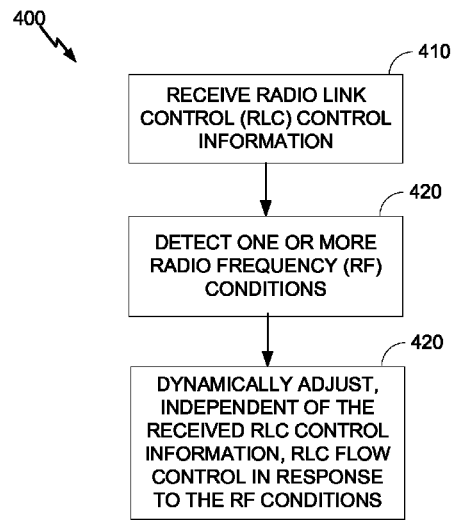
FIG. 4 shows an exemplary flowchart illustrating another implementation of a method of wireless condition based communication in the wireless terminal of FIG. 1.

FIG. 4 is a flowchart illustrating another implementation of a method of transmission power control in a wireless terminal. Although the method 400 is described herein with reference to the wireless terminal 100 discussed above with respect to FIG. 1, a person having ordinary skill in the art will appreciate that the method 400 may be implemented by any other suitable device such as, for example, one or both of the devices 210 and 250 (FIG. 2). In an embodiment, the method 400 may be performed by the CPU 110 in conjunction with the transmitter 162, the receiver 164, and the memory 120. Although the method 400 is described herein with reference to a particular order, in various embodiments, blocks herein may be performed in a different order, or omitted, and additional blocks may be added.

First, the method 400 begins at block 410 where the wireless terminal 100 receives RLC control information. The wireless terminal 100 can receive the RLC control information, for example, from the base station 101 via the antenna 170. In various embodiments, the RLC control information may request and/or command the wireless terminal 100 adjust one or more RLC parameters.

Next, at block 420, the wireless terminal 100 detects one or more RF conditions. As discussed above, RF conditions can include one or more of: RF quality measurements (such as RSCP, Ec/No, CQI, etc.), Block Error Rate (BLER) at various layers (such as physical layer, MAC layer, RLC layer, etc.), number of re-transmissions, occurrence of RLC reset, and other triggering points that reflect poor RF conditions. In some embodiments, the wireless terminal 100 can compare one or more RF metrics with a threshold. When the wireless terminal 100 detects the one or more RF conditions, the method 400 proceeds to block 430.

Then, at block 430, the wireless terminal 100 dynamically adjusts one or at least one RLC flow control, independent of the received RLC control information. For example, the wireless terminal 100 may extend one or more timers and/or counters beyond a value indicated in the received RLC control information. In some embodiments, the wireless terminal 100 may refrain from adjusting an RLC flow control to a value indicated in the received RLC control information.

Accordingly, the wireless terminal 100 may independently, or unilaterally, determine when and how to adjust the RLC flow control parameters. In various circumstances, the wireless terminal 100 may be better able to determine how data should flow over the data channel in order to increase the likelihood of maintaining a simultaneous voice channel.

Figure 5:
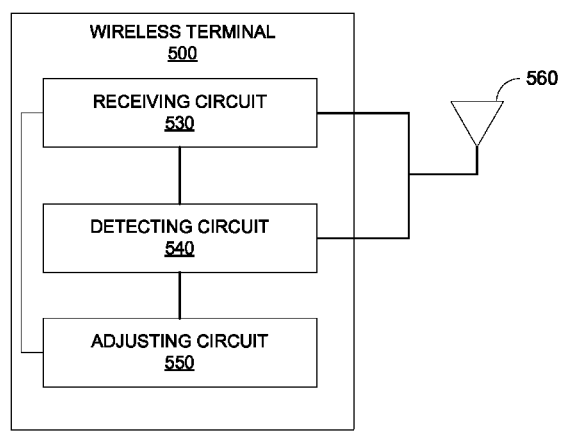
FIG. 5 shows an exemplary functional block diagram of another wireless terminal.

FIG. 5 shows an exemplary functional block diagram of another wireless terminal. Those skilled in the art will appreciate that a wireless terminal may have more components than the simplified wireless terminal 500 illustrated in FIG. 5. The wireless terminal 500 illustrates only those components useful for describing some prominent features of implementations within the scope of the claims.

In the illustrated embodiment, the wireless terminal 500 includes a receiving circuit 530, a detecting circuit 540, an adjusting circuit 550, and an antenna 560. In one implementation the receiving circuit 530 is configured to receive RLC control information. For example, the receiving circuit may be configured to perform block 410 as described with respect to FIG. 4 above. In one implementation, means for receiving includes the receiving circuit 530.

The detecting circuit 540 is configured to detect the one or more RF conditions. For example, the detecting circuit 540 may be configured to perform block 420 as described with respect to FIG. 4 above. In some implementations, the means for detecting includes the detecting circuit 540.

The adjusting circuit 550 is configured to adjust at least one RLC flow control parameter, independent of the received RLC control information. For example, the adjusting circuit 550 may be configured to perform block 430 as described with respect to FIG. 4 above. In one implementation, means for adjusting includes the adjusting circuit 550.

A wireless terminal may comprise, be implemented as, or known as user equipment, a subscriber station, a subscriber unit, a mobile station, a mobile phone, a mobile node, a remote station, a remote terminal, a user terminal, a user agent, a user device, or some other terminology. In some implementations a wireless terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

A base station may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), or some other similar terminology.

In some aspects a base station may comprise an access node for a communication system. Such an access node may provide, for example, connectivity for or to a network (e.g., a wide area network such as the Internet or a cellular network) via a wired or wireless communication link to the network. Accordingly, a base station may enable another node (e.g., a wireless terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless terminal or node may communicate via one or more wireless communication links that are based on or otherwise support any suitable wireless communication technology. For example, in some aspects a wireless terminal may associate with a network. In some aspects the network may comprise a local area network or a wide area network. A wireless terminal may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless terminal may support or otherwise use one or more of a variety of corresponding modulation or multiplexing schemes. A wireless terminal may thus include appropriate components (e.g., air interfaces) to establish and communicate via one or more wireless communication links using the above or other wireless communication technologies. For example, a wireless terminal may comprise a wireless transceiver with associated transmitter and receiver components that may include various components (e.g., signal generators and signal processors) that facilitate communication over a wireless medium.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), a wireless terminal, or a base station. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. At least one processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The above description is provided to enable any person skilled in the art to make or use implementations within the scope of the appended claims. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of managing a wireless connection in a voice and data communication, comprising:
   receiving radio link control (RLC) control information;
   detecting one or more radio frequency (RF) conditions based on the received RLC control information; and
   dynamically adjusting, independent of the received RLC control information, RLC flow control in response to the RF conditions by extending a range of allowable RLC parameter settings.

2. The method of claim 1, wherein the adjusting is performed by user equipment.

3. The method of claim 1, wherein said adjusting is performed by network equipment.

4. The method of claim 1, wherein said adjusting comprises adjusting one or more RLC parameters.

5. The method of claim 1, wherein said adjusting comprises adjusting the one or more RLC parameters beyond respective standardized values.

6. The method of claim 5, wherein the one or more RLC parameters comprise one or more of: max reset timers and counters, RLC window sizes, poll timers, reset timers, and status timers, or a combination thereof.

7. The method of claim 1, wherein said detecting is triggered by at least one of: an RF measurement, a block error rate (BLER), a number of re-transmissions, and an occurrence rate of RLC resets, or a combination thereof.

8. A device configured to manage a wireless connection in a voice and data communication, comprising:
   a receiver configured to receive radio link control (RLC) control information; and a controller configured to:
   detect one or more radio frequency (RF) conditions based on the received RLC control information; and
   dynamically adjust, independent of the received RLC control information, RLC flow control in response to the RF conditions by extending a range of allowable RLC parameter settings.

9. The device of claim 8, wherein the device is configured as user equipment.

10. The device of claim 8, wherein the device is configured as network equipment.

11. The device of claim 8, wherein the controller is configured to adjust the RLC flow control by adjusting one or more RLC parameters.

12. The device of claim 11, wherein the one or more RLC parameters comprise one or more of: max reset timers and counters, RLC window sizes, poll timers, reset timers, and status timers, or a combination thereof.

13. The device of claim 8, wherein the controller is configured to adjust the RLC flow control by adjusting the one or more RLC parameters beyond respective standardized values.

14. The device of claim 8, wherein the controller is configured to detect the one or more radio frequency (RF) conditions triggered by at least one of: an RF measurement, a block error rate (BLER), a number of re-transmissions, and an occurrence rate of RLC resets, or a combination thereof.

15. An apparatus for managing a wireless connection in a voice and data communication, comprising:
   means for receiving radio link control (RLC) control information;
   means for detecting one or more radio frequency (RF) conditions based on the received RLC control information; and
   means for dynamically adjusting, independent of the received RLC control information, RLC flow control in response to the RF conditions by extending a range of allowable RLC parameter settings.

16. The apparatus of claim 15, wherein the means for adjusting comprises user equipment.

17. The apparatus of claim 15, wherein the means for adjusting comprises network equipment.

18. The apparatus of claim 15, wherein means for adjusting comprises means for adjusting one or more RLC parameters.

19. The apparatus of claim 18, wherein the one or more RLC parameters comprise one or more of: max reset timers and counters, RLC window sizes, poll timers, reset timers, and status timers, or a combination thereof.

20. The apparatus of claim 15, wherein means for adjusting comprises means for adjusting the one or more RLC parameters beyond respective standardized values.

21. The apparatus of claim 15, wherein said means for detecting is triggered by at least one of: an RF measurement, a block error rate (BLER), a number of re-transmissions, and an occurrence rate of RLC resets, or a combination thereof.

22. A non-transitory computer readable storage medium comprising instructions that, when executed by at least one processor of an apparatus, cause the apparatus to:
   receive radio link control (RLC) control information;
   detect one or more radio frequency (RF) conditions based on the received RLC control information; and
   dynamically adjust, independent of the received RLC control information, RLC flow control in response to the RF conditions by extending a range of allowable RLC parameter settings.

23. The medium of claim 22, wherein the apparatus comprises user equipment.

24. The medium of claim 22, wherein the apparatus comprises network equipment.

25. The medium of claim 22, further comprising instructions that, when executed by at least one processor of the apparatus, cause the apparatus to adjusting one or more RLC parameters.

26. The medium of claim 25, wherein the one or more RLC parameters comprise one or more of: max reset timers and counters, RLC window sizes, poll timers, reset timers, and status timers, or a combination thereof.

27. The medium of claim 22, further comprising instructions that, when executed by at least one processor of the apparatus, cause the apparatus to adjust the one or more RLC parameters beyond respective standardized values.

28. The medium of claim 22, further comprising instructions that, when executed by at least one processor of the apparatus, cause the apparatus to trigger said detection by at least one of: an RF measurement, a block error rate (BLER), a number of re-transmissions, and an occurrence rate of RLC resets, or a combination thereof.

* * * * *